(12) United States Patent
Braho et al.

(10) Patent No.: US 7,895,039 B2
(45) Date of Patent: Feb. 22, 2011

(54) METHODS AND SYSTEMS FOR OPTIMIZING MODEL ADAPTATION FOR A SPEECH RECOGNITION SYSTEM

(75) Inventors: Keith Braho, Murrysville, PA (US); Jeffrey Pike, Murrysville, PA (US)

(73) Assignee: Vocollect, Inc., Pittsburgh, PA (US)

( * ) Notice: Subject to any disclaimer, the term of this patent is extended or adjusted under 35 U.S.C. 154(b) by 1005 days.

(21) Appl. No.: 11/688,920

(22) Filed: Mar. 21, 2007

(65) Prior Publication Data

US 2007/0192101 A1    Aug. 16, 2007

Related U.S. Application Data

(63) Continuation-in-part of application No. 11/539,456, filed on Oct. 6, 2006, which is a continuation-in-part of application No. 11/331,649, filed on Jan. 13, 2006, which is a continuation-in-part of application No. 11/051,825, filed on Feb. 4, 2005.

(60) Provisional application No. 60/788,621, filed on Apr. 3, 2006, provisional application No. 60/788,606, filed on Apr. 3, 2006, provisional application No. 60/788,622, filed on Apr. 3, 2006.

(51) Int. Cl.
*G10L 15/04* (2006.01)
(52) U.S. Cl. ................................... 704/251
(58) Field of Classification Search ................. 704/251

See application file for complete search history.

(56) References Cited

U.S. PATENT DOCUMENTS 4,882,757 A    11/1989 Fisher et al.

(Continued)

FOREIGN PATENT DOCUMENTS

EP    0867857    9/1998

(Continued)

OTHER PUBLICATIONS

Chengyi Zheng and Yonghong Yan, Improving Speaker Adaptation by Adjusting the Adaptation Data Set.

(Continued)

*Primary Examiner*—Susan McFadden
(74) *Attorney, Agent, or Firm*—Wood, Herron & Evans LLP

(57) ABSTRACT

A method for efficient use of resources of a speech recognition system includes determining a recognition rate, corresponding to either recognition of instances of a word or recognition of instances of various words among a set of words, and determining an accuracy range of the recognition rate. The method may further include adjusting adaptation of a model for the word or various models for the various words, based on a comparison of at least one value in the accuracy range with a recognition rate threshold. An apparatus for efficient use of resources of a speech recognition system includes a processor adapted to determine a recognition rate corresponding to either recognition of instances of a one word or recognition of instances of various words among a set of words, and an accuracy range of the recognition rate. The apparatus may further include a controller adapted to adjust adaptation of a model for the word or various models for the various words, based on a comparison of at least one value in the accuracy range with a recognition rate threshold.

70 Claims, 6 Drawing Sheets

U.S. PATENT DOCUMENTS

| | | | |
|---|---|---|---|
| 4,928,302 | A | 5/1990 | Kaneuchi et al. |
| 4,959,864 | A | 9/1990 | Van Nes |
| 5,127,043 | A | 6/1992 | Hunt et al. |
| 5,127,055 | A | 6/1992 | Larkey |
| 5,230,023 | A | 7/1993 | Nakano |
| 5,297,194 | A | 3/1994 | Hunt et al. |
| 5,428,707 | A | 6/1995 | Gould |
| 5,457,768 | A | 10/1995 | Tsuboi et al. |
| 5,465,317 | A | 11/1995 | Epstein |
| 5,488,652 | A | 1/1996 | Bielby |
| 5,566,272 | A | 10/1996 | Brems et al. |
| 5,602,960 | A | 2/1997 | Hon et al. |
| 5,625,748 | A | 4/1997 | McDonough et al. |
| 5,640,485 | A | 6/1997 | Ranta |
| 5,644,680 | A | 7/1997 | Bielby |
| 5,651,094 | A | 7/1997 | Takagi et al. |
| 5,684,925 | A | 11/1997 | Morin et al. |
| 5,710,864 | A | 1/1998 | Juang et al. |
| 5,717,826 | A | 2/1998 | Setiu et al. |
| 5,737,489 | A | 4/1998 | Chou et al. |
| 5,737,724 | A | 4/1998 | Atal et al. |
| 5,774,841 | A | 6/1998 | Salazar |
| 5,774,858 | A | 6/1998 | Taubkin et al. |
| 5,797,123 | A | 8/1998 | Chou et al. |
| 5,799,273 | A | 8/1998 | Mitchell |
| 5,832,430 | A | 11/1998 | Lleida et al. |
| 5,839,103 | A | 11/1998 | Mammone et al. |
| 5,842,163 | A | 11/1998 | Weintraub |
| 5,893,057 | A | 4/1999 | Fujimoto et al. |
| 5,893,902 | A | 4/1999 | Transue et al. |
| 5,895,447 | A | 4/1999 | Ittycheriah et al. |
| 5,899,972 | A | 5/1999 | Miyazawa et al. |
| 5,946,658 | A | 8/1999 | Miyazawa et al. |
| 5,960,447 | A | 9/1999 | Holt |
| 6,003,002 | A | 12/1999 | Netsch |
| 6,006,183 | A | 12/1999 | Lai et al. |
| 6,073,096 | A | 6/2000 | Gao et al. |
| 6,088,669 | A | 7/2000 | Maes |
| 6,094,632 | A | 7/2000 | Haitori |
| 6,101,467 | A | 8/2000 | Bartosik |
| 6,122,612 | A | 9/2000 | Goldberg |
| 6,151,574 | A | 11/2000 | Lee et al. |
| 6,182,038 | B1 | 1/2001 | Batakrishnan et al. |
| 6,192,343 | B1 | 2/2001 | Morgan et al. |
| 6,205,426 | B1 | 3/2001 | Nguyen et al. |
| 6,230,129 | B1 | 5/2001 | Morin et al. |
| 6,233,555 | B1 | 5/2001 | Parthasarathy et al. |
| 6,233,559 | B1 | 5/2001 | Batakrishnan |
| 6,243,713 | B1 | 6/2001 | Nelson et al. |
| 6,292,782 | B1 | 9/2001 | Weideman |
| 6,330,536 | B1 | 12/2001 | Parthasarathy et al. |
| 6,374,212 | B2 | 4/2002 | Phillips et al. |
| 6,374,221 | B1 | 4/2002 | Haimi-Cohen |
| 6,377,662 | B1 | 4/2002 | Hunt et al. |
| 6,377,949 | B1 | 4/2002 | Gilmour |
| 6,397,180 | B1 | 5/2002 | Jaramillo et al. |
| 6,421,640 | B1 | 7/2002 | Dolfing et al. |
| 6,438,519 | B1 | 8/2002 | Campbell et al. |
| 6,438,520 | B1 | 8/2002 | Curt et al. |
| 6,487,532 | B1 | 11/2002 | Schoofs et al. |
| 6,496,800 | B1 | 12/2002 | Kong et al. |
| 6,505,155 | B1 | 1/2003 | Vanbuskirk |
| 6,507,816 | B2 | 1/2003 | Ortega |
| 6,526,380 | B1 | 2/2003 | Thelen et al. |
| 6,539,078 | B1 | 3/2003 | Hunt et al. |
| 6,542,866 | B1 | 4/2003 | Jiang et al. |
| 6,567,775 | B1 | 5/2003 | Maali et al. |
| 6,571,210 | B2 | 5/2003 | Hon et al. |
| 6,581,036 | B1 | 6/2003 | Varney, Jr. |
| 6,587,824 | B1 | 7/2003 | Everhart |
| 6,594,629 | B1 | 7/2003 | Basu et al. |
| 6,598,017 | B1 | 7/2003 | Yamamoto et al. |
| 6,606,598 | B1 | 8/2003 | Holthouse |
| 6,629,072 | B1 * | 9/2003 | Thelen et al. ............... 704/251 |
| 6,675,142 | B2 | 1/2004 | Ortega |
| 6,732,074 | B1 | 5/2004 | Kuroda |
| 6,735,562 | B1 | 5/2004 | Zhang et al. |
| 6,754,627 | B2 | 6/2004 | Woodward |
| 6,766,295 | B1 | 7/2004 | Murvett |
| 6,799,162 | B1 | 9/2004 | Goronzy |
| 6,832,224 | B2 | 12/2004 | Gilmour |
| 6,834,265 | B2 | 12/2004 | Balasuriya |
| 6,868,381 | B1 | 3/2005 | Peters |
| 6,879,956 | B1 | 4/2005 | Honda et al. |
| 6,882,972 | B2 * | 4/2005 | Kompe et al. ............... 704/255 |
| 6,961,700 | B2 | 11/2005 | Mitchell |
| 6,961,702 | B2 | 11/2005 | Dobler |
| 7,031,918 | B2 | 4/2006 | Hwang |
| 7,039,166 | B1 | 5/2006 | Peterson et al. |
| 7,050,550 | B2 | 5/2006 | Steinbiss |
| 7,062,441 | B1 | 6/2006 | Townshend |
| 7,065,488 | B2 | 6/2006 | Yajima et al. |
| 7,072,750 | B2 | 7/2006 | Pi |
| 7,203,651 | B2 | 4/2007 | Baruch |
| 7,216,148 | B2 | 5/2007 | Matsunami |
| 7,266,492 | B2 | 9/2007 | Goodman |
| 7,392,186 | B2 | 6/2008 | Duan et al. |
| 7,406,413 | B2 * | 7/2008 | Geppert et al. ............... 704/235 |
| 7,457,745 | B2 | 11/2008 | Kadambe et al. |
| 2001/0016816 | A1 | 8/2001 | Lucke |
| 2002/0026312 | A1 | 2/2002 | Tapper |
| 2002/0032566 | A1 | 3/2002 | Tzirkel-Hancock |
| 2002/0049593 | A1 | 4/2002 | Shao |
| 2002/0052742 | A1 | 5/2002 | Thrasher |
| 2002/0103656 | A1 | 8/2002 | Bahler et al. |
| 2002/0135609 | A1 | 9/2002 | Damiba |
| 2002/0138274 | A1 | 9/2002 | Sharma |
| 2002/0143540 | A1 | 10/2002 | Malayath |
| 2002/0152071 | A1 | 10/2002 | Chaiken et al. |
| 2002/0161581 | A1 | 10/2002 | Morin |
| 2002/0173955 | A1 | 11/2002 | Reich |
| 2002/0173956 | A1 | 11/2002 | Hartley et al. |
| 2002/0177999 | A1 | 11/2002 | Ortega |
| 2002/0178004 | A1 | 11/2002 | Chang |
| 2002/0193991 | A1 | 12/2002 | Bennett et al. |
| 2002/0198710 | A1 | 12/2002 | Hernandez-Abrego et al. |
| 2002/0198712 | A1 | 12/2002 | Hinde et al. |
| 2003/0004721 | A1 | 1/2003 | Zhou |
| 2003/0023438 | A1 | 1/2003 | Schram et al. |
| 2003/0036903 | A1 | 2/2003 | Konopka |
| 2003/0120486 | A1 | 6/2003 | Brittan et al. |
| 2003/0125945 | A1 | 7/2003 | Doyle |
| 2003/0139925 | A1 | 7/2003 | Anderson et al. |
| 2003/0149561 | A1 | 8/2003 | Zhou |
| 2003/0154075 | A1 | 8/2003 | Schalk et al. |
| 2003/0154076 | A1 | 8/2003 | Kemp |
| 2003/0191639 | A1 | 10/2003 | Mazza |
| 2003/0220791 | A1 | 11/2003 | Toyama |
| 2004/0024601 | A1 | 2/2004 | Gopinath |
| 2004/0215457 | A1 | 10/2004 | Meyer |
| 2005/0055205 | A1 | 3/2005 | Jersak et al. |
| 2005/0071161 | A1 | 3/2005 | Shen |
| 2005/0080627 | A1 | 4/2005 | Hennebert et al. |
| 2005/0086055 | A1 | 4/2005 | Sakai et al. |
| 2005/0137868 | A1 | 6/2005 | Epstein et al. |
| 2007/0073540 | A1 | 3/2007 | Hirakawa et al. |

FOREIGN PATENT DOCUMENTS

| | | |
|---|---|---|
| EP | 0905677 | 3/1999 |
| EP | 1011094 | 6/2000 |
| EP | 1377000 | 1/2004 |
| WO | WO0211121 | 2/2002 |
| WO | WO2005119193 A1 | 12/2005 |

WO WO2006031752 A2 3/2006

OTHER PUBLICATIONS

Silke Goronzy, Krzysztof Marasek, Ralf Kompe, Semi-Supervised Speaker Adaptation, Sony International (Europe) GmbH, Advanced Technology Center Stuttgart (ATCS), Home Network Company Europe, Man Machine Interfaces.

Silke Goronzy, Krzysztof Marasek, Ralf Kompe, Semi-Supervised Speaker Adaptation, in Proceedings of the Sony Research Forum 2000, vol. 1, Tokyo, Japan, 2000.

International Search Report mailed May 26, 2006.

Christensen, "Speaker Adaptation of Hidden Markov Models using Maximum Likelihood Linear Regression", Thesis, Aalborg University, Apr. 1996.

Mokbel, "Online Adaptation of HMMs to Real-Life Conditions: A Unified Framework", IEEE Trans. on Speech and Audio Processing, May 2001.

International Search Report mailed Nov. 20, 2007.

International Search Report mailed Nov. 6, 2007.

Smith, Ronnie W., An Evaluation of Strategies for Selective Utterance Verification for Spoken Natural Language Dialog, Proc. Fifth Conference on Applied Natural Language Processing (ANLP), 1997, 41-48.

Kellner, A., et al., Strategies for Name Recognition in Automatic Directory Assistance Systems, Interactive Voice Technology for Telecommunications Applications, IVTTA '98 Proceedings, 1998 IEEE 4th Workshop, Sep. 29, 1998.

International Search Report mailed Nov. 26, 2007.

* cited by examiner

METHODS AND SYSTEMS FOR OPTIMIZING MODEL ADAPTATION FOR A SPEECH RECOGNITION SYSTEM

RELATED APPLICATIONS

This application is a continuation-in-part of U.S. patent application Ser. No. 11/539,456, entitled "Methods and Systems for Adapting a Model for a Speech Recognition System" filed Oct. 6, 2006, which is a continuation-in-part of U.S. patent application Ser. No. 11/331,649, entitled "Methods and Systems for Considering Information About an Expected Response When Performing Speech Recognition" filed Jan. 13, 2006, which is a continuation-in-part application of U.S. patent application Ser. No. 11/051,825, entitled "Method and System for Considering Information About an Expected Response When Performing Speech Recognition" filed Feb. 4, 2005, which all applications are incorporated herein by reference in entirety. This application also claims the benefit of U.S. Provisional Application No. 60/788,621, entitled "Methods and Systems for Optimizing Model Adaptation for a Speech Recognition System", filed Apr. 3, 2006, U.S. Provisional Application No. 60/788,606, entitled "Methods and Systems for Adapting a Model for a Speech Recognition System", filed Apr. 3, 2006, and U.S. Provisional Application No. 60/788,622, entitled "Method and Systems for Assessing and Improving the Performance of a Speech Recognition System", filed on Apr. 3, 2006, which all applications are incorporated herein by reference in entirety.

TECHNICAL FIELD

The invention relates to speech recognition and, more particularly, to improving the accuracy and efficiency of speech recognition systems.

BACKGROUND

Example Applications for Speech Recognition Systems

Speech recognition systems have simplified many tasks particularly for a user in the workplace by permitting the user to perform hands-free communication with a computer as a convenient alternative to communication via conventional peripheral input/output devices. For example, a user could wear a wireless wearable terminal having a speech recognition system that permits communication between the user and a central computer system so that the user can receive work assignments and instructions from the central computer system. The user could also communicate to the central computer system information such as data entries, questions, work progress reports, and working condition reports. In a warehouse or inventory environment, a user can be directed (through an instruction from the central computer system or visually by means of a display) to a particular work area that is labeled with a multiple-digit number (check-digit) such as "1-2-3" and asked to speak the check-digit. The user would then respond with the expected response "1-2-3". (Note that a "check-digit" can be any word or sequence of words, and is not limited to digits.) Other such examples of communication between a user and speech recognition system are described in U.S. Patent Application Serial No. 2003/0154075 and include environments where a wearable or portable terminal is not required such as in an automobile or a telephone system; environments that are not in a warehouse such as in a pharmacy, retail store, and office; voice-controlled information processing systems that process for example credit card numbers, bank account numbers, social security numbers and personal identification numbers; other applications such as command and control, dictation, data entry and information retrieval applications; and speech recognition system features such as user verification, password verification, quantity verification, and repeat/acknowledge messages. The inventions presented here can be used in those applications. In using a speech recognition system, manual data entry is eliminated or, at the least, reduced, and users can perform their tasks faster, more accurately, and more productively.

Example Speech Recognition Errors

Errors can be made by a speech recognition system however, due to for example background noise or a user's unfamiliarity or misuse of the system. The errors made by a system can be classified into various types. A metric, an error rate (which can be defined as the percentage or ratio of observations with speech recognition errors over the number of observations of the system and which can be determined over a window of time and/or data and per user) is often used to evaluate the number and types of errors made by a speech recognition system and is thus useful in evaluating the performance of the system. An observation can be defined as any speech unit by which speech recognition may be measured. An observation may be a syllable, a phoneme, a single word or multiple words (such as in a phrase, utterance or sentence). When counting the number of observations of the system, the observations input to the system may be counted or the observations output by the system may be counted. One skilled in the art will also know and understand that an accuracy rate (which can be defined as the percentage or ratio of correct observations of the system over the number of observations of the system and which can be determined over a window of time and/or date and per user) can be used to evaluate the performance of the system. Therefore, a recognition rate (which can be an error rate, an accuracy rate, or other type of recognition rate) is useful in evaluating the performance of the system. In general, a recognition rate can be determined for a word or for various words among a set of words, or for a user or multiple users. Identification of a system's errors can be done by comparing a reference transcription of a user's input speech to the hypothesis generated by the system (the system's interpretation of the user's input speech). Furthermore, as known to those skilled in the art, the comparison can be time-aligned mode or text-aligned.

One type of speech recognition error is a substitution, in which the speech recognition system's hypothesis replaces a word that is in the reference transcription with an incorrect word. For example, if system recognizes "1-5-3" in response to the user's input speech "1-2-3", the system made one substitution: substituting the '5' for the '2'.

Another type of speech recognition error is a deletion, in which the speech recognition system's hypothesis lacks a word that is in the reference transcription. For example, if system recognizes "1-3" in response to the user's input speech "1-2-3", the system deleted one word, the '2'. One variation of the deletion error is a deletion due to recognizing garbage, in which the system erroneously recognizes a garbage model instead of recognizing an actual word. Another variation of the deletion error is a deletion due to a speech misdetection, where the system fails to detect that the audio input to the system contains speech and as a result does not submit features of the audio input to the system's search algorithm. Another type of deletion occurs when the system rejects a correct observation due to a low confidence score. Yet another variation of the deletion error is a deletion due to a rejected substitution, where a search algorithm of the speech recognition generates a substitution which is later rejected by an acceptance algorithm of the system. Still another type of deletion, occurring in time-aligned comparisons, is a merge: the speech recognition system recognizes two spoken words as one. For example, the user says "four-two" and the system outputs "forty".

In this application, a garbage model refers to the general class of models for sounds that do not convey information. Examples may include for example models of breath noises, "um", "uh", sniffles, wind noise, the sound of a pallet dropping, the sound of a car door slamming, or other general model such as a wildcard that is intended to match the input audio for any audio that doesn't match a model in the library of models.

Yet another type of speech recognition error is an insertion, in which the speech recognition system's hypothesis includes a word (or symbol) that does not correspond to any word in the reference transcription. Insertion errors often occur when the system generates two symbols that correspond to one symbol. One of these symbols may correspond to the reference transcription and be tagged as a correct observation. If it does not correspond to the reference transcription, it can be tagged as a substitution error. In either case, the other symbol can be tagged as an insertion error. Insertion errors are common when noise is mistakenly recognized as speech.

In contrast to determining that an actual error occurred by comparing a system's hypothesis to words actually spoken in a reference transcript, an error can be estimated or deemed to have occurred based on system behavior and user behavior. This application describes methods for determining a recognition rate, wherein the recognition rate is an estimate based on estimated errors or correct observations deemed to have occurred after evaluating system and user behavior. Accordingly, one can estimate or evaluate the performance level of the speech recognition system by detecting in this manner the various errors committed by or correct observations of the system. One way to detect a speech recognition error is based on feedback a user provides to the speech recognition system. Feedback can be requested by the speech recognition system. For example, the system could ask the user to confirm the system's hypothesis by asking the user for example "Did you say 1-5-3?", and if the user responds "no", it indicates that the system made an error recognizing "1-5-3". Another type of feedback is based on a user's emotion detected by speech recognition. For example, if the system recognizes in the user's input speech that the user is sighing or saying words indicating aggravation, it may indicate that an error occurred. Yet another type of feedback is based on a user's correction command to the system, such as the user speaking "back-up" or "erase", or the user identifying what word was spoken (which could be from a list of possible words displayed by the system). When a correction is commanded to the system, it may be that an error occurred.

Model Adaptation for a Speech Recognition System

A speech recognition system can improve its performance over time, as more speech samples are received and processed by a speech recognition system, by improving its acoustic models through training or other learning or adaptation algorithms. At the same time, it is desirable to prevent the system from adapting in an undesirable way, thereby resulting in a system that performs worse than it did prior to adaptation or a system that degrades over time. Avoiding additional processing by a speech recognition system due to adaptation of acoustic models is particularly useful in applications employing a battery powered mobile computer, wireless network, and server to store models. Adapting models can use significant computational resources to create the adapted models and radio transmission energy to transmit the new models to the server. Example embodiments of the invention disclosed herein can control adaptation of the speech recognition system to avoid inefficient use of computational, storage and/or power resources and to avoid adapting away from well-performing models. Example embodiments of the invention control adaptation by using triggers, which are based on a recognition rate determination or estimation and the accuracy of the recognition rate determination or estimation, to cause the adaptation of prior models or create new models.

BRIEF DESCRIPTION OF THE DRAWINGS

The accompanying drawings, which are incorporated in and constitute a part of this specification, illustrate speech recognition system components and embodiments of the invention and, together with the detailed description of the embodiments given below, serve to explain the principles of the invention.

DETAILED DESCRIPTION OF EXAMPLE EMBODIMENTS OF THE INVENTION

Figure 1A:
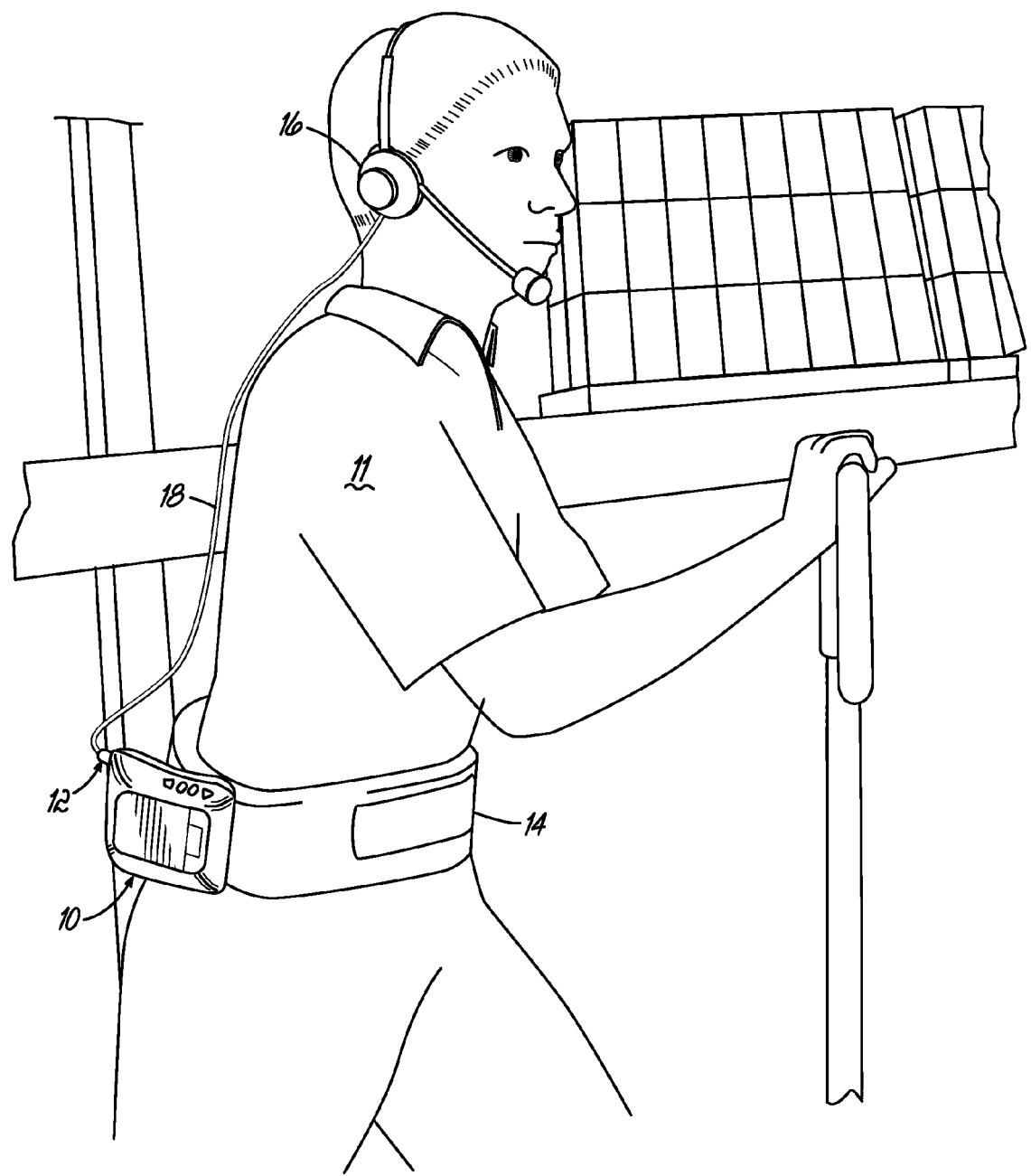
FIG. 1A illustrates a perspective view of a user using a portable terminal and headset, according to an example embodiment of the invention.

A speech recognition system can be improved by adaptive learning or training of the acoustic models used by the speech recognition system. The example embodiments described herein involve situations wherein improved methods for determining or estimating an accurate recognition rate are utilized to improve adaptation by a speech recognition system. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those skilled in the art. Thus, the invention can include any variety of combinations and/or integrations of the embodiments described herein.

One approach for efficient use of resources of a speech recognition system includes determining a recognition rate, corresponding to either recognition of instances of a word or recognition of instances of various words among a set of words, determining an accuracy range of the recognition rate, corresponding to a desired confidence level. In addition, the approach may include using a recognition rate threshold and the desired confidence level upon which to base model adaptation, wherein a model for the word is adapted or various models for the various words are adapted, based upon a comparison of at least one value in the accuracy range with the recognition rate threshold. The approach may be implemented as an apparatus, which may include all or a subset of the following: a processor adapted to determine a recognition rate, corresponding to either recognition of instances of a word or recognition of instances of various words among a set of words, and determine an accuracy range of the recognition rate corresponding to a desired confidence level; and a controller adapted to use a recognition rate threshold and the desired confidence level upon which to base model adaptation, by adapting a model for the word or various models for the various words based upon a comparison of at least one value in the accuracy range with the recognition rate threshold.

Another approach for efficient use of resources of a speech recognition system includes using a recognition rate threshold and a desired confidence level of a recognition rate upon which to base adaptation of a model. The approach may further include determining a recognition rate and determining an accuracy range of the recognition rate corresponding to the desired confidence level, the accuracy range related to a number of observations. Furthermore, the approach may include using a relationship between the recognition rate threshold, the recognition rate and the number of observations, which balances the accuracy of the recognition rate with expediency in making a model adaptation decision. And the approach may include basing a decision for model adaptation on using the relationship. The approach may be implemented as an apparatus, which may include all or a subset of the following: a selector adapted to use a recognition rate threshold and a desired confidence level of a recognition rate upon which to base adaptation of a model; a processor adapted to determine a recognition rate and an accuracy range of the recognition rate corresponding to the desired confidence level, the accuracy range related to a number of observations; and a controller adapted to base a decision for model adaptation on using a relationship between the recognition rate threshold, the recognition rate and the number of observations, which balances the accuracy of the recognition rate with expediency in making a model adaptation decision.

Yet in another approach, a method for optimizing determination of a recognition rate of a speech recognition system includes determining a number of observations that would yield a desired accuracy range of the recognition rate. The approach may be implemented as an apparatus, which may include a processor adapted to determine a number of observations that would yield a desired accuracy range of the determination.

Still another approach for efficient use of resources of a speech recognition system includes determining a recognition rate, corresponding to either recognition of instances of a word or recognition of instances of various words among a set of words, and determining an accuracy range of the recognition rate. The approach may further include adjusting adaptation of a model for the word or various models for the various words, based on a comparison of at least one value in the accuracy range with a recognition rate threshold. The approach may be implemented as an apparatus which may include all or a subset of the following: a processor adapted to determine a recognition rate corresponding to either recognition of instances of a word or recognition of instances of various words among a set of words, and an accuracy range of the recognition rate; and a controller adapted to adjust adaptation of a model for the word or various models for the various words, based on a comparison of at least one value in the accuracy range with a recognition rate threshold.

Another approach for efficient use of resources of a speech recognition system includes selecting a recognition rate threshold upon which to base, at least in part, adaptation or change of a speech recognition model, determining a recognition rate corresponding to either recognition of instances of a word or recognition of instances of various words among a set of words, determining an accuracy range of the recognition rate, and adapting or changing a model for the word or various models for the various words, based on a comparison of the recognition rate, within the limits of the determined accuracy range, with the recognition rate threshold. The approach may be implemented as an apparatus which may include all or a subset of the following: a selector adapted to select a recognition rate threshold upon which to base, at least in part, adaptation or change of a speech recognition model, a processor adapted to determine a recognition rate corresponding to either recognition of instances of a word or recognition of instances of various words among a set of words, and an accuracy range of the recognition rate, and a controller adapted to control adapting or changing a model for the word or various models for the various words, based on a comparison of the recognition rate, within the limits of the determined accuracy range, with the recognition rate threshold.

An approach for expedited model adaptation for a speech recognition system includes selecting a recognition rate threshold upon which to base at least in part adaptation or change of a speech recognition model, determining a recognition rate, corresponding to either recognition of instances of a word or recognition of instances of various words among a set of words, using a process in which increasing numbers of observations result in greater accuracy in determining the recognition rate, and deciding when to adapt or change a model for the word or various models for the various words, as a function of the distance of a determined recognition rate from the recognition rate threshold. The approach may be implemented as an apparatus which may include all or a subset of the following: a selector adapted to select a recognition rate threshold upon which to base, at least in part, adaptation or change of a speech recognition model, a processor adapted to determine a recognition rate corresponding to either recognition of instances of a word or recognition of instances of various words among a set of words, using a process in which increasing numbers of observations result in greater accuracy in determining the recognition rate, and a controller adapted to decide when to adapt or change a model for the word or various models for the various words, as a function of the distance of a determined recognition rate from the recognition rate threshold. In either of the two approaches, less accuracy, and thus fewer observations may be required to make a model adaptation or change based on a determined recognition rate distant from the recognition rate threshold than a determined recognition rate close to the recognition rate threshold.

Example Embodiments of Speech Recognition Systems

FIG. 1A illustrates a perspective view of a user using a portable terminal 10 and headset 16, according to an example embodiment of the invention. Portable terminal 10 may be a wearable device, which may be worn by a user 11 such as on a belt 14 as shown. Use of the term "portable terminal" herein is not limited and may include any computer, device, machine, or system which is used to perform a specific task. Portable terminal 10 may comprise processing circuitry, including a processor for controlling the operation of the portable terminal and other associated processing circuitry. (The processing circuitry may implement one or more example embodiment speech recognition methods disclosed herein.) Headset 16 may be coupled to the portable terminal by a cord 18 or by a wireless connection (not shown in FIG. 1A) and the headset is worn on the head of the user 11. (In another example embodiment, the speech recognition system is located in headset 16, eliminating the need for portable terminal 10.) A user can speak in a spoken language, through a microphone in the headset 16 and the audio information is processed by the speech recognition system in portable terminal 10. U.S. patent application Ser. No. 10/671,142, entitled "Apparatus and Method for Detecting User Speech", incorporated herein by reference, provides further details for implementing such a system. Applications for example embodiments of the invention are not strictly limited to the warehouse environment and portable terminals 10 shown in FIG. 1A. Other applications and environments in which example embodiments may be implemented are described in the BACKGROUND section of this application.

Figure 1B:
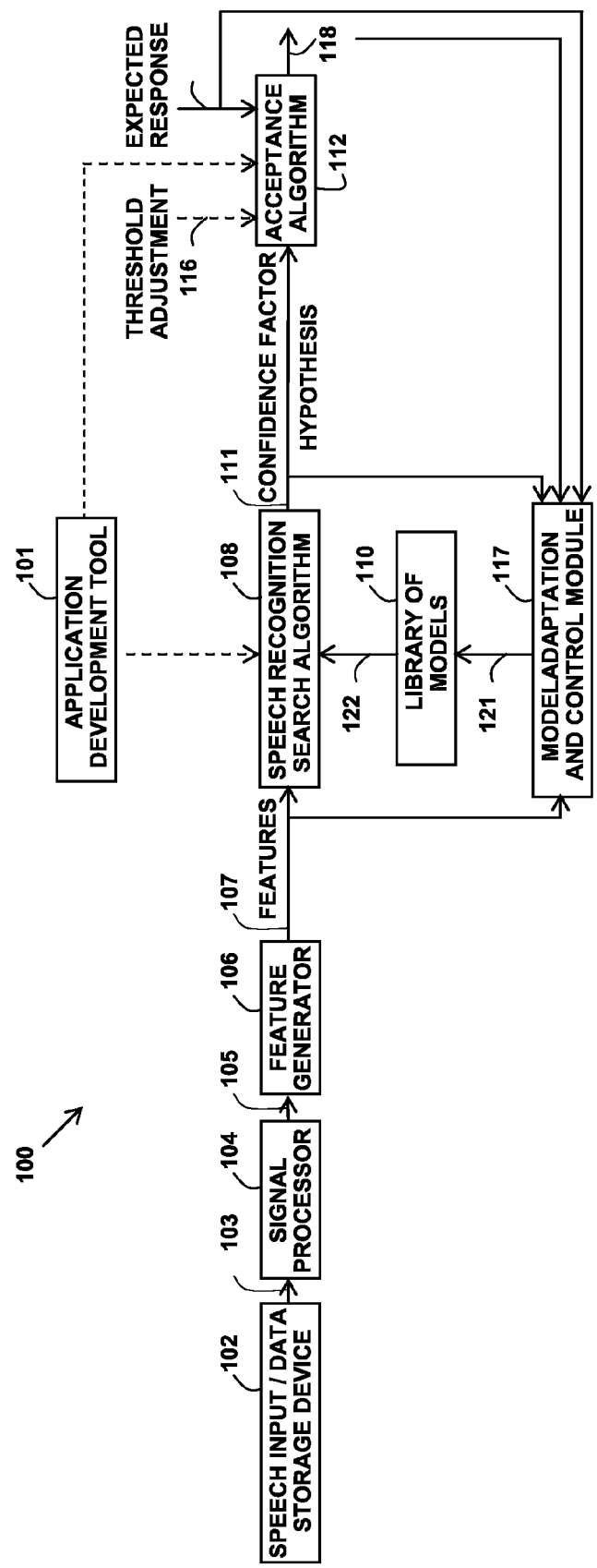
FIG. 1B illustrates a schematic view of a speech recognition system, according to an example embodiment of the invention.

FIG. 1B illustrates a schematic view of a speech recognition system, according to an example embodiment of the invention. One of ordinary skill in the art will recognize that the various functional blocks of the speech recognition system, including the inventive features, can be implemented using a variety of different technologies. The invention can be implemented into various different hardware and software configurations. One particular application for the invention is within a portable or wearable terminal that is used for voice-directed work. However, other implementations are possible as well and the invention is not limited to such voice-directed work applications. Furthermore, to implement various features of the inventive embodiment, the speech recognition software might be modified. Alternatively, a separate module might be utilized to modify the speech recognition system according to aspects of the invention.

Referring to FIG. 1B, in system 100, a speech signal, such as from a system user, may be captured by a speech input device 102 in a variety of conventional ways. Typically, a microphone or other electro-acoustical device senses speech input from a user and converts it into an analog voltage signal 103 that then is forwarded to a signal processor 104. As is conventionally known, the signal processor 104 includes the necessary analog-to-digital converters, filters, and equalization circuitry and/or software that convert the analog speech input 103 into a digitized stream of data 105 that can be separated into separate units for analysis. Alternatively, this audio data from device 102 can be retrieved from a data storage device. As discussed herein, the system 100 might be realized by suitable hardware and/or software. As such, the blocks shown in FIG. 1B are not meant to indicate separate circuits or to be otherwise limiting, but rather show the functional features and components of the system.

In particular, the signal processor 104 divides the digital stream of data that is created into a sequence of time-slices, or frames 105, each of which is then processed by a feature generator 106, thereby producing features (vector, matrix, or otherwise organized set of numbers representing the acoustic features of the frames) 107. Further explanation of an example speech recognition system is provided in U.S. Pat. No. 4,882,757, entitled "Speech Recognition System", the disclosure of which is incorporated herein by reference in its entirety. This referenced patent discloses Linear Predictive Coding (LPC) coefficients to represent speech; however, other functionally equivalent methods are contemplated within the scope of the invention as well.

A speech recognition search algorithm function 108, realized by an appropriate circuit and/or software in the system 100 analyzes the features 107 in an attempt to determine what hypothesis to assign to the speech input captured by input device 102. As is known in the art in one recognition algorithm, the recognition search 108 relies on probabilistic models provided through 122 from a library of suitable models 110 to recognize the speech input 102. Each of the models in the library 110 may either be customized to a user or be generic to a set of users.

When in operation, the search algorithm 108 (which can be implemented using Hidden Markov Models with a Viterbi algorithm or other modeling techniques such as template matching dynamic time warping (DTW) or neural networks), in essence, compares the features 107 generated in the generator 106 with reference representations of speech, or speech models, in library 110 in order to determine the word or words that best match the speech input from device 102. Part of this recognition process is to assign a confidence factor for the speech to indicate how closely the sequence of features 107 used in the search algorithm 108 matches the closest or best-matching models in library 110. As such, a hypothesis consisting of one or more vocabulary items and associated confidence factors 111 is directed to an acceptance algorithm 112, which also can take as input a threshold adjustment 116 and one or more expected responses 114. If the confidence factor is above a predetermined acceptance threshold, then the acceptance algorithm 112 makes a decision 118 to accept the hypothesis as recognized speech. If, however, the confidence factor is not above the acceptance threshold, as utilized by the acceptance algorithm, then the acceptance algorithm 112 makes a decision 118 to ignore or reject the recognized speech. The system may then ignore the input or prompt the user to repeat the speech. In this instance, the user may repeat the speech to input device 102. The hypothesis and confidence factors 111, the expected response 114, acceptance algorithm decision 118 and features 107 can also be input to a model adaptation control module 117. Model adaptation control module 117 (which may be implemented in a hardware or software controller or control mechanism) controls the adaptation of library of models 110.

An Example Embodiment Model Adaptation Control Module

Figure 2:
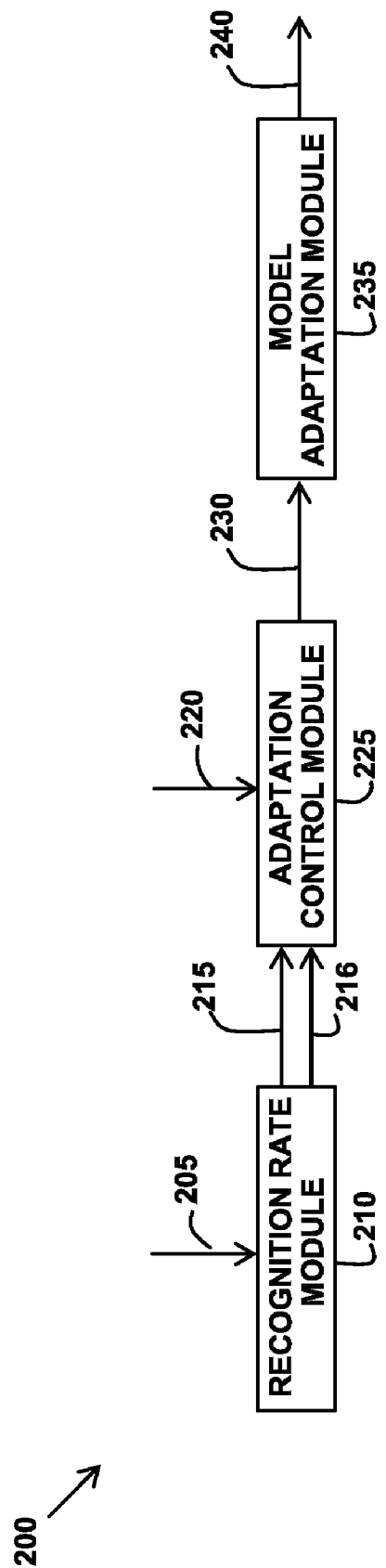
FIG. 2 illustrates a schematic view of a component of a speech recognition system, according to an example embodiment of the invention.

FIG. 2 illustrates a model adaptation control module 200, an example embodiment implementation of the model adaptation control module 117 in FIG. 1B. Recognition rate module 210 (which may be implemented in a processor) determines a recognition rate of the speech recognition system. The recognition rate may be an error rate, which can be defined as the percentage or ratio of observations with speech recognition errors over the number of observations of the system, and the error rate can be determined over a window of time (e.g. predetermined length of time) and/or data (e.g. predetermined number of utterances input to the system). An observation can be defined as any speech unit by which speech recognition may be measured. An observation may be a syllable, a phoneme, a single word or multiple words (such as in a phrase, utterance or sentence). When counting the number of observations of the system, the observations input to the system may be counted or the observations output by the system may be counted. For example, the recognition rate can be a word error rate, the percentage or ratio of speech recognition errors over the number of words input into the system. The recognition rate may also be an accuracy rate, which can be defined as the percentage or ratio of correct observations (correct recognitions) by the system over the number of observations of the system, and the accuracy rate can be determined over a window of time (e.g. predetermined length of time) and/or data (e.g. predetermined number of utterances input to the system). (An utterance is a spoken phrase of at least one word such as '1' or "1-2-3".) Furthermore, the recognition rate can be determined or estimated in the following ways: per user; over a number of users, per word; over a set of words; or per a group of consecutively spoken words, such as an utterance, phrase or sentence. Furthermore, the recognition rate determined by module 210 can be based on actual errors, correct observations and observations as determined from comparing the system's hypothesis to the reference transcript or based on estimates of these deemed to have occurred after evaluating system and user behavior, as discussed later in this application. Therefore, the recognition rate determination may also be a recognition rate estimation.

Recognition rate module 210 also determines the accuracy range of the recognition rate that meets the desired confidence level (which may be selected beforehand and be implemented either in hardware or software). Inputs 205 are those needed for a recognition rate determination used for a particular application. In this example embodiment, inputs 205 are a hypothesis and confidence factor (such as 111 of FIG. 1B) with its associated timing information and expected response (such as 114 of FIG. 1B). Recognition rate module 210 outputs a recognition rate 215 and an accuracy range of the recognition rate 216 to adaptation control module 225.

Adaptation control module 225 controls or adjusts the adaptation of models by model adaptation module 235. Inputs 220 are those needed for the particular control of model adaptation desired for a particular application. In this example embodiment, inputs 220 are a hypothesis and features (such as 107 of FIG. 1B). Adaptation control module 225 outputs instructions 230 to model adaptation module 235. In this example embodiment, instructions 230 can include instructions of when to adapt a certain model or models (including instructions to adapt or withhold adaptation), which utterances to use to adapt the models (including the transcription of the utterance and the features observed by the recognition system corresponding to the utterance). By providing control instructions 230, adaptation control module 225, can control when adaptation should occur and determine the criteria to be met before adaptation is ordered. Furthermore, once adaptation is to proceed, the application or adaptation control module may determine whether the existing models are replaced with new models created with the new features only or whether the existing models are just adapted using information from both the new features and the existing features of the existing models. Model adaptation module 235 outputs adapted models 240 to the library (such as 110 of FIG. 1B) of models.

Figure 3:
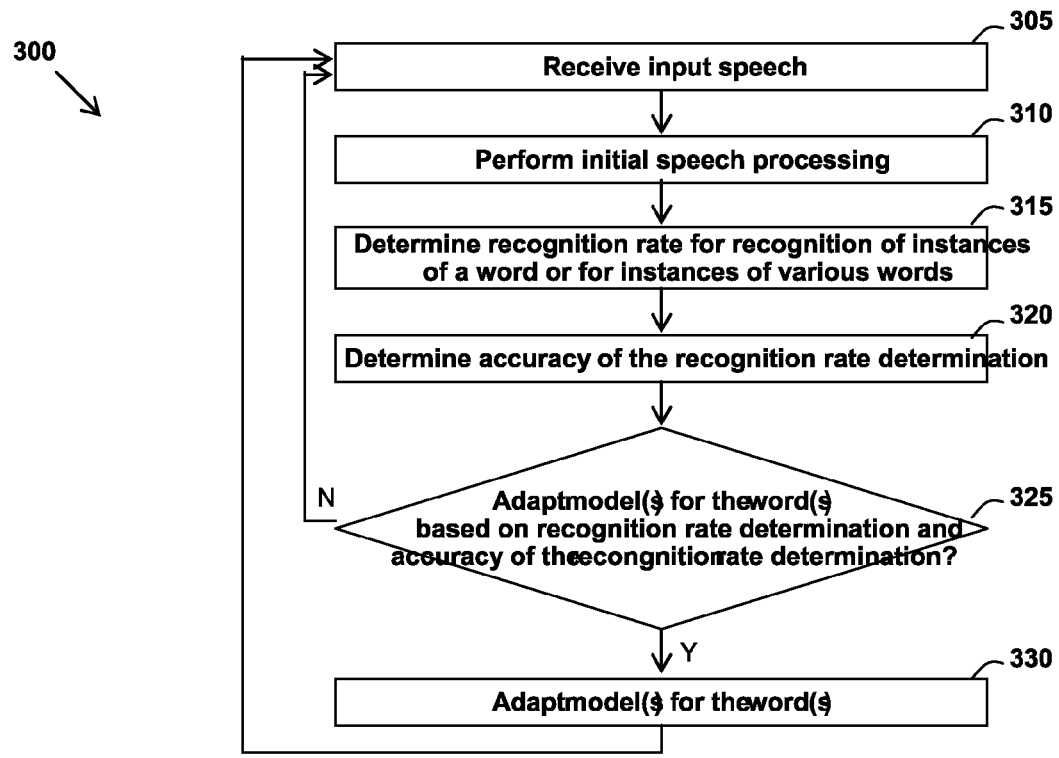
FIG. 3 is a flowchart illustrating a method for controlling model adaptation based on a recognition rate and the accuracy of the recognition rate, according to an example embodiment of the invention.

In an example embodiment, an adaptation control module (such as 225 of FIG. 2) uses a recognition rate (such as 215 of FIG. 2) and the accuracy range of the recognition rate (such as 216 of FIG. 2) to control the adaptation (including adapting or withholding adaptation) of models (by for example model adaptation module 235 of FIG. 2). By controlling adaptation, the speech recognition system prevents adaptation from causing recognition accuracy to get worse when it's at an acceptable level and avoids inefficient use of computational, storage and/or power resources. Furthermore, the use of an accuracy range of the recognition rate can allow an expedient model adaptation decision to be made. FIG. 3 illustrates such an example embodiment.

The techniques illustrated in the flowcharts of FIGS. 3-7 may be performed sequentially, in parallel or in an order other than that which is described. It should be appreciated that not all of the techniques described are required to be performed, that additional techniques may be added, and that some of the illustrated techniques may be substituted with other techniques.

Example Embodiment Methods for Controlling Model Adaptation

FIG. 3 is a flow chart illustrating a method 300 for controlling or adjusting model adaptation. It can be executed by a component of a speech recognition system, such as model adaptation and control module 117 of FIG. 1B. At 305, input speech is received by the speech recognition system from for example a user or a recording from a user's session. At 310, initial speech processing is performed (such as processing of the input speech performed by the signal processor 104, feature generator 106 and speech recognition search algorithm 108 of FIG. 1B) for words input to the system. At 315, the recognition rate, corresponding to either recognition of instances of a word or for recognition of the instances of various words, is determined or estimated. For example, the recognition rate can be based on recognition errors for the word '1', for the words '1', '2' and '3', for all digits, or for all words in the vocabulary of the system. The recognition rate can be an updated recognition rate based on instances previously and currently input to the system. At 320, the accuracy range of the recognition rate is determined for the desired confidence level. At 325, a determination is made whether to adapt (such as by the processing of the model adaptation control module 117 of FIG. 1B) a model for the word or various models for the various words, based on the recognition rate and the accuracy range of the recognition rate. For example, a determination can be made to adapt the model for the word '1' based on a recognition rate for the word '1'. In another example, a determination can be made to adapt all words that are digits, based on a combined recognition rate for all of the digits. If it was determined that the model(s) should not be adapted, next is 305. Otherwise, next is 330, where the model(s) are adapted. After 330 is executed, control returns to 305. Model adaptation in 330 can be performed in the background with control returning to 305 immediately. In other words, the speech recognition system can continue to receive and process speech while the models are being adapted. Furthermore, the recognition rate and the accuracy range of the recognition rate can be updated after a predetermined number of observations has occurred. The predetermined number of observations can be one or more.

Example Embodiment Methods for Determining the Recognition Rate

An example embodiment of 315 in FIG. 3, determination of the recognition rate, is as follows. It can be executed by a component of a speech recognition system, such as model adaptation and control module 117 of FIG. 1B or the recognition rate determination module 210 of FIG. 2. In an example embodiment, the recognition rate is an error rate, determined using the equation:

$$RATEerror = \frac{\text{\# errors}}{n} \qquad (1a)$$

where,
errors is the number of observations with speech recognition errors,
n is the number observations of the system, and
RATEerror is the value of the error rate.

In another example embodiment, the recognition rate is an accuracy rate, determined using the equation:

$$RATEaccuracy = \frac{\# CorrectObservations}{n} \quad (1b)$$

where,
CorrectObservations is the number of correct observations of the system,
n is the number of observations of the system, and
RATEaccuracy is the value of the accuracy rate.

In other example embodiments, the recognition rate can be determined or estimated or in the following ways: over a window of time; over a window of data observed by the system; per user; over a number of users; per word; for a set of words. Furthermore, the recognition rate need not be a word recognition rate, but can another type of recognition rate such as a syllable recognition rate, a phoneme recognition rate, a phrase recognition rate, an utterance recognition rate, and a sentence recognition rate. Therefore, n can be counted in view of any one or more of these parameters. However, for this discussion of various example embodiments of the invention, a word recognition rate in which n is the number of words input to the system will be used.

Example Embodiment Methods for Determining the Accuracy Range of the Recognition Rate An example embodiment of 320 in FIG. 3, determination of the accuracy range of the recognition rate, is as follows. It can be executed by a component of a speech recognition system, such as model adaptation and control module 117 of FIG. 1B or the recognition rate module 210 of FIG. 2. The accuracy of the recognition rate is based on the number of words observed by the system. Furthermore, the accuracy is in the form of a range of values corresponding to a particular confidence level of the recognition rate.

Example Embodiment Two-Sided Accuracy Range of a Recognition Rate

Specifically, a two-sided accuracy range of a recognition rate can be determined (assuming a large number of observations: e.g., n is greater than 100) as follows:

$$RATEaccuracy = RATE \pm z\sqrt{\frac{RATE(1-RATE)}{n}} \quad (2)$$

where,
z is a value that is based on a desired confidence level,
n is the number of observations of the system,
RATE is the value of the recognition rate, and
RATEaccuracy is the two-sided accuracy range of the recognition rate.

Example z values for certain confidence levels are:
for a 95% confidence level, z=1.96
for a 90% confidence level, z=1.645
for a 80% confidence level, z=1.282

The two values generated by equation (2) are the low-end and the high-end values of the two-sided accuracy range of the recognition rate, for a certain confidence level. (Other equations may be used when n is not greater than 100). One skilled in the art will know and understand that there are other equations which can provide a range based on a confidence level, that equation (2) is an example embodiment method to provide an accuracy range, and the invention is not restricted in just using it.

To illustrate use of equation (2), if RATE=2%, n=600 words, z=1.96 (for a 95% confidence level), the two-sided accuracy range of the recognition rate is 0.9% to 3.1%. In other words, in this example, there is a 95% level of confidence that the recognition rate is in the range of 0.9% to 3.1%.

Example Embodiment One-Sided Accuracy Range of a Recognition Rate

A one-sided accuracy range of a recognition rate can be determined (assuming n is greater than 100) as follows:

$$RATEaccuracy = RATE + z\sqrt{\frac{RATE(1-RATE)}{n}} \quad (3)$$

where,
z is a value that is based on a desired confidence level,
n is the number of observations of the system,
RATE is the recognition rate, and
RATEaccuracy is the high-end value of a one-sided accuracy range of the recognition rate.

Example z values for certain confidence levels are:
for a 95% confidence level, z=1.645
for a 90% confidence level, z=1.282
for a 80% confidence level, z=0.482

The value generated by equation (3) is the high-end value of a one-sided accuracy range of the recognition rate. Alternatively, one can generate a low-end value of a one-sided accuracy range of the recognition rate by modifying equation (3) to have a negative sign "−" instead of a positive sign "+", i.e., $$RATEaccuracy = RATE - z\sqrt{\frac{RATE(1-RATE)}{n}} \quad (4)$$

To illustrate use of equation (3), if RATE=2%, n=600 words, z=1.645 (for a 95% confidence level), the high-end value of a one-sided accuracy range of the recognition rate is 2.9%. In other words, in this example, there is a 95% level of confidence that the recognition rate is a value below 2.9%. To illustrate use of equation (4), if RATE=2%, n=600 words, z=1.645 (for a 95% confidence level), the low-end value of a one-sided accuracy range of the recognition rate is 1.1%. In other words, in this example, there is a 95% level of confidence that the recognition rate is a value above 1.1%.

Example Embodiment Methods for Determining Whether to Adapt Based on the Recognition Rate and the Accuracy Range of the Recognition Rate An example embodiment of 325 in FIG. 3, a decision of whether to adapt a certain model associated with a certain word, based on the accuracy of the recognition rate, is as follows. It can be executed by a component of a speech recognition system, such as model adaptation and control module 117 of FIG. 1B or the adaptation control module 225 of FIG. 2. To make this determination, a value in the accuracy range of the recognition rate is compared to a recognition rate threshold and the outcome of this comparison influences the decision 325 of whether to adapt (adapt or withhold adapting) the model. (The recognition rate threshold may be selected before the comparison is made by for example a user or a selector implemented in either hardware or software.) For example, in an example embodiment that uses a two-sided accuracy range of the recognition rate (and the recognition rate is an error rate), if the low-end value of the range is equal to or exceeds the recognition rate threshold, the decision 325 is to adapt the model. In an example embodiment that uses a two-sided accuracy range of the recognition rate (and the recognition rate is an accuracy rate), if the low-end value of the range is equal to or is below the recognition rate threshold, the decision 325 is to adapt the model. Tables 1 and 2 illustrate adaptation decisions based on a comparison of the low-end value (of two-sided and one-sided accuracy ranges) with a recognition rate threshold.

In Table 1, example error rates are used for the recognition rate. In these examples, the low-end value in the accuracy range of an error rate is used to determine whether to perform model adaptation. If this value is below the recognition rate threshold, the speech recognition system may be performing well and accordingly, the adaptation decision is that adaptation should not be performed. If the value is above or equal to the recognition rate threshold, it is presumed that the system is not performing well and the adaptation decision is that adaptation should be performed.

TABLE 1

| RATE | desired con-fidence | z | n | low-end | high-end | recognition rate threshold | adaptation decision |
|---|---|---|---|---|---|---|---|
| examples using a two-sided accuracy range of the recognition rate: | | | | | | | |
| 2% | 95% | 1.96 | 600 | 0.9% | 3.1% | 2% | N |
| 2% | 95% | 1.96 | 2000 | 1.4% | 2.6% | 2% | N |
| 5% | 95% | 1.96 | 600 | 3.3% | 6.7% | 2% | Y |
| 10% | 95% | 1.96 | 300 | 6.6% | 13.4% | 2% | Y |
| examples using a one-sided accuracy range of the recognition rate: | | | | | | | |
| 2% | 95% | 1.645 | 600 | 1.1% | — | 2% | N |
| 2% | 95% | 1.645 | 2000 | 1.5% | — | 2% | N |
| 5% | 95% | 1.645 | 600 | 3.5% | — | 2% | Y |
| 10% | 95% | 1.645 | 300 | 7.2% | — | 2% | Y |

In Table 2, example accuracy rates are used for the recognition rate. In these examples, the high-end value in the accuracy range of an accuracy rate to determine whether to perform model adaptation. If this value is above the recognition rate threshold, the speech recognition system may be performing well and accordingly, the adaptation decision is that adaptation should not be performed. If the value is below or equal to the recognition rate threshold, it is presumed that the system is not performing well and the adaptation decision is that adaptation should be performed.

TABLE 2

| RATE | desired con-fidence | z | n | low-end | high-end | recognition rate threshold | adaptation decision |
|---|---|---|---|---|---|---|---|
| examples using a two-sided accuracy range of the recognition rate: | | | | | | | |
| 98% | 95% | 1.96 | 600 | 96.9% | 99.1% | 98% | N |
| 98% | 95% | 1.96 | 2000 | 97.4% | 98.6% | 98% | N |
| 95% | 95% | 1.96 | 600 | 93.3% | 96.7% | 98% | Y |
| 90% | 95% | 1.96 | 300 | 86.6% | 93.4% | 98% | Y |
| examples using a one-sided accuracy range of the recognition rate: | | | | | | | |
| 98% | 95% | 1.645 | 600 | — | 98.9% | 98% | N |
| 98% | 95% | 1.645 | 2000 | — | 98.5% | 98% | N |
| 95% | 95% | 1.645 | 600 | — | 96.5% | 98% | Y |
| 90% | 95% | 1.645 | 300 | — | 92.8% | 98% | Y |

It can be understood that values other than the low-end value of an accuracy range of an error rate can be used in a comparison with a recognition rate threshold in order to determine whether to adapt. For example, values in the lower half of the accuracy range of the error rate can be used in comparison with the recognition rate threshold. In another example, the high-end value of an accuracy range or values in the upper half of the accuracy range can be used in comparison with the recognition rate threshold.

Likewise, values other than the high-end value of an accuracy range of an accuracy rate can be used in a comparison with a recognition rate threshold in order to determine whether to adapt.

Relationships Between the Number of Observations of the Speech Recognition System, the Accuracy of the Recognition Rate and the Recognition Rate Threshold The inventors have recognized that there is a relationship between the number of observations of the speech recognition system and the accuracy of the recognition rate. As the number of observations increases, the accuracy range of the recognition rate decreases thereby producing more reliable determinations of the recognition rate. (In other words, the accuracy range is inversely related to the number of observations.) Equations (1)-(4) above illustrate this relationship. Also, the higher the desired confidence level for the accuracy of recognition rate, the number of observations required to achieve the desired confidence level is greater for the same accuracy range. For example, if the desired confidence level of the recognition rate is selected at a 95%, more observations are needed to achieve the 95% desired confidence level than if the desired confidence level was selected at 80% for the same accuracy range. Using this relationship, model adaptation can be optimized by balancing the selected desired confidence level against the number of observations required to achieve the confidence level for a given accuracy range.

Another relationship that the inventors have recognized is the relationship between the number of observations of the speech recognition system, the recognition rate and the recognition rate threshold. Specifically, the further away the recognition rate is from the recognition rate threshold, fewer observations are needed to be confident in the decision of whether to adapt. Table 3 illustrates this relationship using an error rate for the recognition rate. In all examples shown, there is a decision to adapt because the low-end value of the accuracy range of the error rate is equal to or exceeds the error rate threshold. However, the number of observations n required to arrive at this decision to adapt (at a 95% confidence level), dramatically decreases as the difference between the error rate and the error rate threshold increases.

Therefore, as the difference between the error rate and the error rate threshold increases, a decision to adapt is made with increasing expediency, since fewer observations are needed to arrive at the decision to adapt due to the increased difference between the determined error rate and the error rate threshold.

TABLE 3

| RATE | desired confidence | z | n | low-end | high-end | recognition rate threshold | adapt decision |
|------|--------------------|------|------|---------|----------|----------------------------|----------------|
| 2.5% | 95% | 1.96 | 3746 | 2.0% | 3.0% | 2.0% | Y |
| 3% | 95% | 1.96 | 1118 | 2.0% | 4.0% | 2.0% | Y |
| 4% | 95% | 1.96 | 369 | 2.0% | 6.0% | 2.0% | Y |
| 5% | 95% | 1.96 | 203 | 2.0% | 8.0% | 2.0% | Y |
| 6% | 95% | 1.96 | 136 | 2.0% | 10.0% | 2.0% | Y |
| 7% | 95% | 1.96 | 101 | 2.0% | 12.0% | 2.0% | Y |
| 8% | 95% | 1.96 | 79 | 2.0% | 14.0% | 2.0% | Y |
| 9% | 95% | 1.96 | 65 | 2.0% | 16.0% | 2.0% | Y |
| 10% | 95% | 1.96 | 55 | 2.1% | 17.9% | 2.0% | Y |

Example Embodiments of Error Rates

Throughout this present application, there are various example embodiments for determining or estimating the occurrences of possible (or potential or suspected) errors made by a speech recognition system and an error rate (which can be performed by the recognition rate module 210 of FIG. 2 and 315 of FIG. 3. The error rate can be used to control or adjust adaptation by the adaptation control module 225 of FIG. 2 and 325 of FIG. 3). The error rate can be based on any one or combination of the various speech recognition errors discussed in this present application, such as those in the BACKGROUND section of this present application and those discussed below. For example, the error rate can be the ratio of insertion errors over words input to the system. Or for example, the error rate can be the ratio of insertion, substitution and deletion errors over the words input to the system. Or for example, the error rate can be the combination of the low confidence rate and the substitution rates discussed below. The example embodiment error rates discussed below are based on estimated errors which are deemed to have occurred based on evaluating system behavior, the expected response and/or user behavior. Thus, these estimated error rates provide an advantage of not requiring a reference transcript of words input to the system and comparison of the system's hypotheses corresponding to the words input to the system.

Low Confidence Rate

Figure 4:
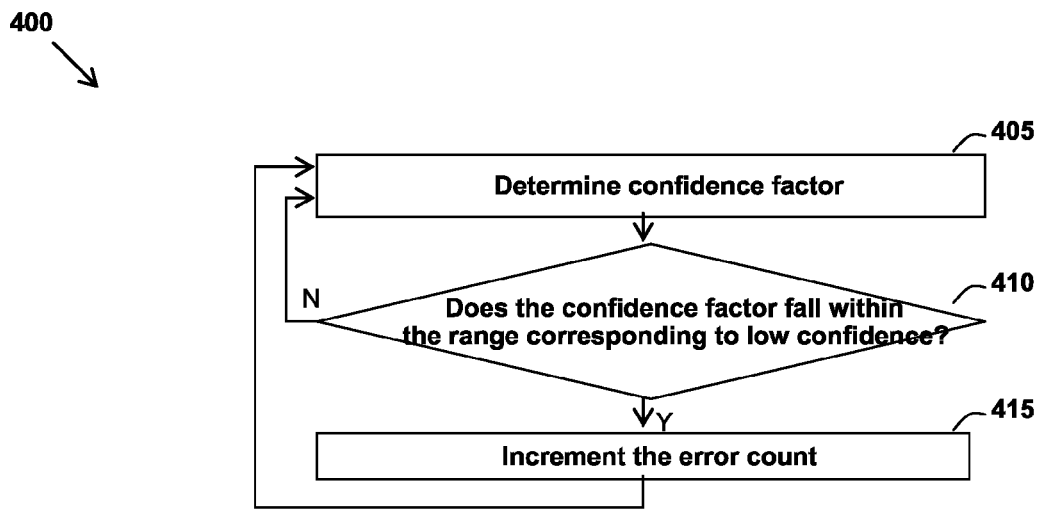
FIGS. 4-6 are flowcharts illustrating methods for estimating an error rate, according to example embodiments of the invention.

In an example embodiment of the invention, a count of occurrences of possible errors made by a speech recognition system called a low confidence rate, can be used to determine an estimate of a low confidence rate or an estimate of an error rate. FIG. 4 is a flow chart illustrating a method 400 for identifying errors, which can be executed by components of a speech recognition system, such as the recognition rate module 210 of FIG. 2. The low confidence rate is the rate at which a word is recognized with a confidence factor within a certain range corresponding to low confidence that the system recognized the word correctly. In other words, the low confidence rate is the frequency at which a word was recognized by the speech recognition system with a confidence factor that is relatively low depending on the application in which the speech recognition system is used. Note that a low confidence rate does not necessarily measure errors by the speech recognition system, but the low confidence rate (or a fraction of its value) can be used in addition to or in place of error rate estimates where error rates (or error rate estimates) are used.

In FIG. 4, at 405, the confidence factor for a hypothesized word is determined. (This confidence factor can be generated by search algorithm 108 of FIG. 1B and supplied to the recognition rate module 210 of FIG. 2.) At 410, the confidence factor is compared with a range of values corresponding to low confidence that the system recognized the word correctly for the application in which the system is used. If at 410 it is determined that the confidence factor is outside of the low confidence range, control is returned to 405. If it is determined at 410 that the confidence factor is within the low confidence range, the error count is incremented at 415. After 415, control returns to 405. The error count in 415 may then be combined with counts of other error types to generate an error rate.

An example embodiment, which uses a low confidence rate, also considers when a word is from a hypothesis generated by the system that matches an expected response in counting errors for an error rate estimation. (U.S. patent application Ser. No. 11/051,825, and the BACKGROUND section of this present application describes scenarios in which an expected response from a user is processed by a speech recognition system. An expected response can be defined as a response that the system expects to receive from the user, as a result of the application in which the system is used). In an example embodiment in the referenced patent application, a matching algorithm of the system normally requires that the system's hypothesis is accepted only if a confidence factor for the hypothesis exceeds an acceptance threshold. However, when the system's most likely hypothesis matches an expected response, the hypothesis is more favorably treated so that the hypothesis may be accepted by the system. The reasoning behind the favorable treatment despite the relatively low confidence factor is that a hypothesis matching an expected response usually indicates a high probability of correct recognition.

Turning back to the example embodiment of the invention, in which the error rate is a low confidence rate, responses that match the expected response and have a relatively low confidence factor for the application in which the system is used are counted as errors for an error rate estimation. Although a recognition error may not have actually occurred (because the system's hypothesis was correctly accepted due to the hypothesis matching the expected response as described in referenced U.S. patent application Ser. No. 11/051,825), in this example embodiment, a word with a relatively low confidence is counted as an error for an error rate estimation due to the relatively low confidence factor. The range of confidence factors for which a word is counted as a low confidence could be, for example, between the adjusted acceptance threshold and the original, unadjusted acceptance threshold. More generally, the confidence factor thresholds or range for the counting low confidence errors do not need to match the acceptance threshold and adjusted acceptance threshold in the referenced patent application. The range could be between two other thresholds, including a high confidence threshold, which is higher than the acceptance threshold and indicates the boundary between low and high confidence. In this example embodiment, the range of confidence factors used for the low confidence rate is determined based on the application in which the speech recognition system is used.

Substitution Rate

In example embodiment of the invention, a count of occurrences of possible substitution errors made by a speech recognition system can be used to determine an estimate of a substitution error rate or an estimate of an error rate. The substitution rate is the rate at which substitution errors (such as the substitution errors defined in the BACKGROUND section of this present application) are made by a system. In an example embodiment, a hypothesis generated by the speech recognition system is compared to an expected response and a substitution error occurs if the system replaces a word in the expected response with an incorrect word in the hypothesis. For example, if the system recognizes "1-5-3" and the expected response is "1-2-3", a substitution error is counted because it is deemed that the system made one substitution: substituting the '5' for the '2'. In other words, if the hypothesis and the expected response do not match word-for-word, but do mostly match, (i.e. the hypothesis and the expected response match except for a predetermined number of words), it is a reasonable assumption that a word substitution error has occurred. (The predetermined number of words depends upon the application. For example, an application that uses three-word hypotheses or utterances may define "mostly match" as matching word-for-word except for one word. An application that uses five-word hypotheses or utterances may define "mostly match" as matching word-for-word except for two words.)

Repeated Utterances

Figure 5:
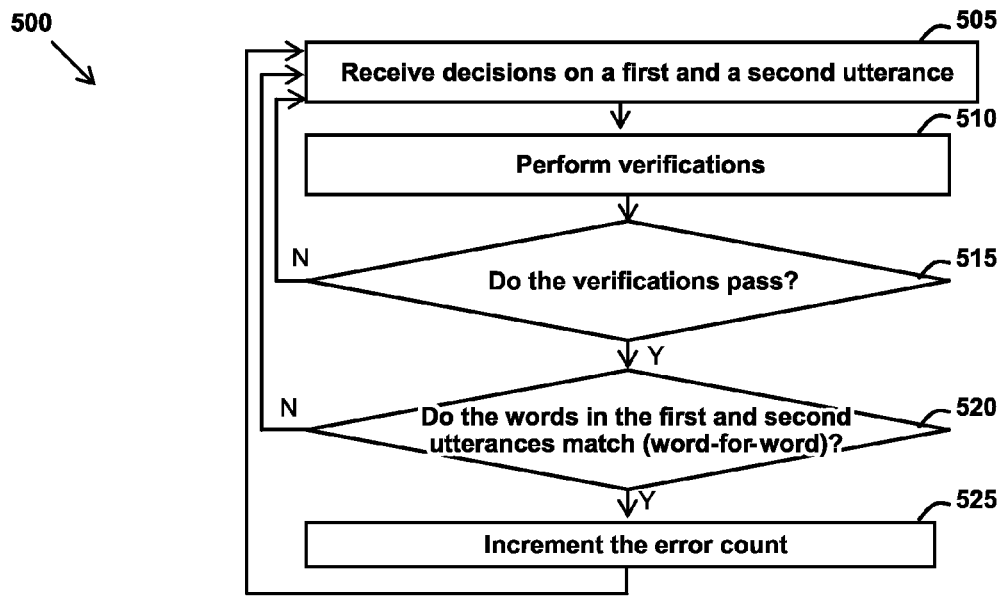
Figure 6:
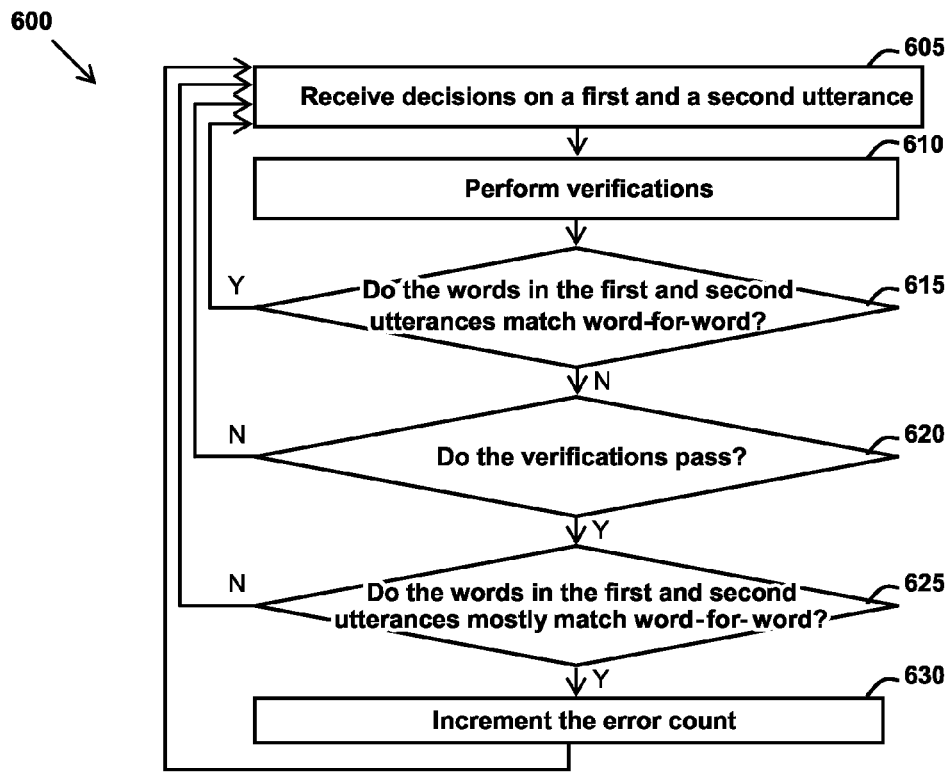

Yet in other example embodiments, the error rate is based on a recognition error made by the speech recognition system that is realized after comparing the speech recognition system's decision on its hypothesis of at least two consecutive or proximate utterances. The decision can occur after the speech recognition system has processed the incoming utterances (such as at 118 of FIG. 1B, after the acceptance algorithm in 112 of FIG. 1B is executed). The recognition error can be for example to reject the system's hypothesis of an incoming utterance, after which the user repeats the utterance, in response to the system's response or lack of one. Or for example, the recognition error can be to substitute a word that speech recognition system is unable to recognize, with another word or "garbage" word, in the speech recognition system output. FIGS. 5-6 illustrate example embodiment methods to estimate these types of error rates.

Reject and Repeat

FIG. 5 is a flow chart illustrating a method 500 of an example embodiment error rate for identifying possible occurrences of errors made by a speech recognition system. The count of the possible occurrences of errors can be used to determine an estimate of an error rate. Method 500 can be executed by a component of a speech recognition system, such as recognition rate module 210 of FIG. 2. In this embodiment, the determination of whether the speech recognition system made an error is made when the speech recognition system receives at least two consecutive or proximate utterances. The system behavior and user behavior is as follows: the system rejects its hypothesis of the first utterance; the user repeats the first utterance in the second utterance; and the system accepts its hypothesis of the second utterance. The first and second hypotheses generated by the system substantially match. In other words, the hypotheses match word-for-word but a hypothesis may or may not also include a recognized model that is considered to be negligible for this particular error determination. For example, a hypothesis could include a recognized model indicating a user's breath or sigh and these recognized models may or may not be considered negligible for this particular error determination. (The determination of whether a recognized model is negligible depends upon the particular speech recognition system and the application in which it is used.) An example is as follows: a user speaks a first utterance "1-2-3", the system correctly recognizes it (i.e. generates a hypothesis of "1-2-3") but rejects its hypothesis because of a low confidence factor; the user repeats "1-2-3" in a second utterance and the system correctly recognizes it (i.e. generates a hypothesis of "1-2-3") and accepts its hypothesis. A rationale behind this type of error detection mechanism is that the user repeats himself/herself because the system did not recognize the first utterance. Since the system accepts its hypothesis of the second utterance, one could reasonably assume that the system should have accepted its hypothesis of the first utterance and that it erred in not doing so. This heuristic can alternatively require that the two utterances are spoken within a predetermined amount of time of each other, or further refined by also requiring that utterances are spoken consecutively.

In FIG. 5, at 505, decisions made by a speech recognition system (such as at 118 of FIG. 1B) on a first and second utterance are received for processing by a model adaptation and control module (such as 117 of FIG. 1B). At 510, verifications are performed. These verifications can include one or more of the following conditions: verifying that the system's hypotheses of those utterances contain multiple words; verifying that the system's hypothesis of the second utterance contains all accepted words; verifying that there was at least one rejected word in the system's hypothesis for the first utterance; verifying that the hypothesis match the expected response (if there is one). At 515, if the verifications pass, next is 520. Otherwise, control returns to 505. At 520, the words in the first and second hypotheses are compared word-for-word to find if they match. For example, if the first hypothesis is "one-two-three" and the second hypothesis is "one-three-three", there is a mismatch. If the hypotheses match word-for-word, there is a high probability that an incorrect rejection error has occurred, with the reasoning that the user repeated himself and the speech recognizer recognized the second utterance correctly. If the hypotheses match word-for-word, next is 525. Otherwise, control returns to 505. At 525, the error count is incremented and control returns to 505. The error count in 525 may then be combined with counts of other error types to generate an overall error rate.

Substitute and Repeat

FIG. 6 is a flow chart illustrating a method 600 of an example embodiment for identifying possible occurrences of errors made by a speech recognition system. The count of the possible occurrences of errors can be used to determine an estimate of an error rate or an estimate for part of an error rate. Method 600 can be executed by a component of a speech recognition system, such as recognition rate module 210 of FIG. 2. In this embodiment, the determination of whether the speech recognition system made an error is made when the speech recognition system receives at least two consecutive or proximate utterances and the system substitutes a word in its hypothesis of the first utterance and recognizes and accepts all of the words in its hypothesis of the second utterance. An example is as follows: a user speaks a first utterance "1-2-3"; the system misrecognizes it (e.g. generates a hypothesis "1-5-3") and accepts its hypothesis; the user repeats "1-2-3" in a second utterance within a proximity of the first utterance; the system correctly recognizes it (i.e. generates a hypothesis "1-2-3") and accepts its hypothesis. A rationale behind this method of detecting errors is that if the two utterances are spoken consecutively or within a proximity of each other, and if the system accepts its hypothesis of the second utterance, then the system likely made a substitution in its hypothesis of the first utterance. There are heuristics that may be used to guard against the system considering consecutive or proximate recognitions differing by a single word as containing a substitution error when in fact they do not. The heuristics include checking for one or more of the following possible conditions: there were no intervening utterances that indicate that the first utterance was correctly recognized by the system; the two utterances being compared represent the same piece of information being entered into the system, for example, the two utterances being compared occurred at the same position in the dialogue between the user and the recognition system or in response to the same prompt; the two utterances were spoken within a predetermined amount of time or in other words the time between the two utterances being compared was short enough to suggest that the user was repeating the initial utterance.

In FIG. 6, at 605, decisions made by a speech recognition system (such as at 118 of FIG. 1B) on a first and second utterance are received for processing by a model adaptation and control module (such as 117 of FIG. 1B). At 610, verifications are performed. These verifications improve the accuracy of the estimate of the substitution error rate and can include: verifying that the utterances were spoken consecutively or within a proximity of each other; verifying that the system's hypotheses of the utterances contain multiple words; verifying that the system's hypotheses of the utterances contain all accepted words; verifying that the user was prompted for the same information by the system both times; verifying that the first hypothesis does not match the expected response (if there is one); verifying that the second hypothesis does match the expected response (if there is one); and checking for a condition indicating a substitution error occurred (such as those described above). At 615, the words in the system's hypotheses of the first and second utterances are compared word-for-word to see if they match. If the hypotheses do not match word-for-word, next is 620. Otherwise, control returns to 605. At 620, if the verifications pass, next is 625. Otherwise, control returns to 605. At 625, the words in the system's hypotheses of the first and second utterances are compared word-for-word to find how closely they match. For example, if the first hypothesis is "1-2-3" and the second hypothesis is "1-5-3", there is a mismatch of one word. In this case, the '5' was substituted for the '2'. If the hypotheses do not match word-for-word but do mostly match, (e.g. the hypotheses match except for one word), it is a reasonable assumption that a word substitution error has occurred, with the reasoning that the system performed verifications such as checking for at least one condition indicating a substitution error occurred, the user repeated the same utterance, the system recognized the second utterance correctly, and the system incorrectly substituted in its hypothesis of the first utterance. (The definition of "mostly match" depends upon the application. For example, an application that uses five-word hypotheses or utterances may define "mostly match" as matching word-for-word except for two words.) If the hypotheses mostly match word-for-word, next is 630 where the error count is incremented followed by control returning to 605. The error count in 630 may then be combined with counts of other error types to generate an overall error rate.

The same approach as in the previous paragraph can be used to detect deletion due to garbage errors where a content word is recognized as garbage in a first utterance, then correctly recognized in the next utterance. By comparing the recognition results of the two utterances and using verifications such as those described above, one can detect the error. For example, if the system's hypothesis of the first utterance is "1-GARBAGE-3" and the system's hypothesis of the second utterance is "1-5-3", there is a mismatch of one word, and it becomes a reasonable assumption that the speech recognition system made an error in its hypothesis of the first utterance. Again, similar verifications as described above may be used to guard against the system considering a correct observation to be in error.

The same approach as described above in the discussion of FIG. 6 can also be used to detect other types of errors, such as a deletion due to rejected substitution error. An example of a deletion due to rejected substitution error is as follows. A user speaks a first utterance "1-5-3" and the system generates a hypothesis "1-2-3", but the system rejects the '2' in its hypothesis. The user repeats himself/herself in a second utterance "1-5-3" within a proximity of the first utterance and the system recognizes it (i.e. generates a hypothesis "1-5-3") and the system accepts its hypothesis. When the system recognized and rejected the '2' in its hypothesis of the first utterance, the system made a deletion due to rejected substitution error. The method for detecting this type of error is similar to that described in the discussion of FIG. 6, with the difference that the system's hypothesis of the first utterance does not need to contain all accepted words.

Correction Rate

In an example embodiment error rate for a speech recognition system, a correction rate at which a user provides feedback to the system can be used as an estimate of an error rate or an estimate for part of an error rate. The reasoning behind using a correction rate to estimate an error rate or estimate part of an error rate is that when a correction is commanded to the system, it may indicate that an error occurred. Examples of user feedback are described in the BACKGROUND section of this present application. The correction rate can include the rate at which the user indicates that the system made a mistake. Furthermore, the user may provide feedback in response to the system requesting feedback, such as asking the user to confirm a hypothesis generated by the system or asking the user to identify what word was spoken by the user. The feed back may include a word indicating aggravation by the user or the feed back may be a correction command to the system, such as "back-up" or "erase".

Recognition Rate Considerations

In determining or estimating the recognition rate (error rate, accuracy rate or other type of recognition rate), considerations can be made for the amount of time and data needed to determine or estimate a recognition rate that is useful for the application in which the speech recognition system is used. One example consideration is that the recognition rate is determined or estimated for speech input to the speech recognition system over a predetermined period of time. Other example considerations are that the recognition rate is determined or estimated for speech input to the speech recognition system over a predetermined number of utterances, words, or hypotheses.

Other example considerations are that the recognition rate is determined or estimated from hypotheses of utterances collected over a moving or sliding window or a collection period that is dynamic in period of time and/or size of data. As a result, the recognition rate is determined or estimated over a period when useful data has been collected. For example, a moving or sliding window can cover a collection of data taken from equal periods in noisy environment and a quiet environment to offset any favoring by the speech recognition system in one of those environments. Other examples of moving, sliding windows are those that collect data only during recent use (e.g. the last half-hour) of the speech recognition system, collecting data for time spent by a particular user (e.g. since the user started using the system), or collecting a certain amount of data regardless of the time spent collecting the data (e.g. the last one-hundred hypotheses).

It can be understood by those skilled in the art that in other example embodiments of the invention, other recognition rates can be used in place of the recognition rate, such as a phrase recognition rate, utterance recognition rate, and sentence recognition rate. For example, a recognition rate can be defined as the percentage or ratio of either utterances with errors or correctly recognized utterances made by a system divided by the number of utterances input to the system and this utterance recognition rate can be used in controlling or adjusting an adaptation of a model.

In addition, it will be evident to one skilled in the art that the various methods to identify possible errors or correct observations can process the same hypotheses, but safeguards must be taken to avoid double counting, as some possible errors or correct observations may be counted by more than one method. Furthermore, in example embodiments of the invention, the desired confidence level and/or accuracy range of the recognition rate and/or recognition rate threshold can be a predetermined value(s), a value(s) settable by a user, a dynamic value(s), or it can be adjusted upwardly or downwardly. Moreover, the desired confidence level and/or accuracy range can be based on factors that affect the achievable recognition rate of the speech recognition system and those that determine an acceptable recognition rate for the application in which the system is used.

Furthermore, the desired confidence level and/or accuracy range and/or recognition rate threshold can be based on a number of words in an utterance input to the speech recognition system, based on a background noise level, based on a signal-to-noise ratio, based on a number of words in the vocabulary of a speech recognition system or based on a recognition rate corresponding to a particular user or users of the system.

Example Embodiments for Model Adaptation

Figure 7:
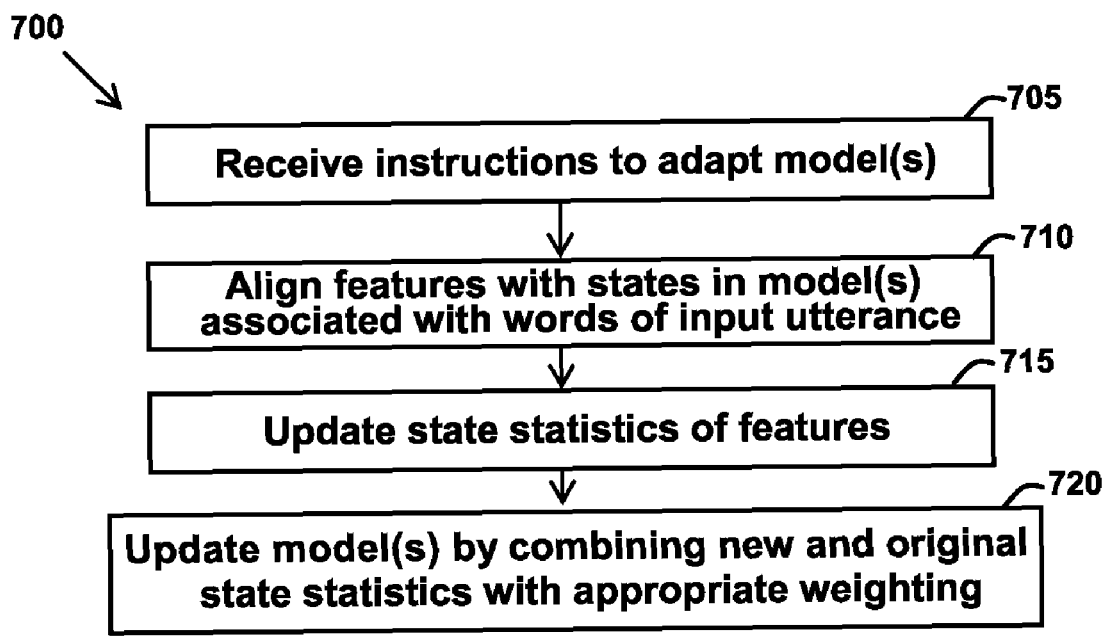
FIG. 7 is a flowchart illustrating a method for model adaptation, according to an example embodiment of the invention.

FIG. 7 is a flow chart illustrating a method 700 for model adaptation, according to an example embodiment of the invention. It can be executed by a component of a speech recognition system, such as the model adaptation module 235 of FIG. 2. In an example embodiment, method 700 is executed under the control of a control module (such as 220 of FIG. 2). In other words, method 700 is performed based on instructions from a control module. The instructions can include instructions of when to adapt a certain model or multiple models (including instructions to adapt or withhold adaptation) and information needed to perform the adaptation, such as transcription of an utterance and a set of features observed by the speech recognition system corresponding to the utterance. At 705, the instructions are received.

At 710, the features observed by a speech recognition system corresponding to an input utterance are aligned with the states in the models for the words of the utterance. In an example embodiment, the Baum-Welch re-estimation algorithm can be used to perform the alignment. At 715, the statistics (for example, means and variances) of the states are updated using the values of the features. At 720, these values are mixed into the models with an appropriate weighting to maintain a balance between previous training data and new features. Thus, in an example embodiment of the invention, new models are created through adaptation by using the observed features of an input utterance to adapt existing or original models. In that scenario, both the observed features of the input utterance and the existing features of the original models, and the statistics associated with each, are used to create the new models. Additionally, in such a scenario, the new statistics might be weighted in various fashions to tailor their effect on the original statistics in the model. In an alternative example embodiment of the invention, only the new observed features, and information therefrom, are utilized to create the new model. That is, a new model is created with the new features only. Furthermore, the adaptation could be performed using data from a single user or multiple users. In one particular embodiment, only speech data from an individual user might be used to perform the adaptation. This generates a model that is adapted for that user and performs well for that user.

The invention, in its various forms, may be implemented directly in the software of a speech recognition system. That is, the improvements are actually part of the speech recognition system. Alternatively, the invention does not have to be built into the speech recognition system. Rather, the invention or parts of the invention may be implemented in a separate program or application may be utilized by a speech recognition system to provide the benefits of the invention. For example, a separate application or software module may be utilized to handle the adaptation in accordance with the principles of the invention. Specifically, an application may interface with a speech recognition system to determine a recognition rate and/or control when and how models are adapted.

In the foregoing description, the invention is described with reference to specific example embodiments thereof. The specification and drawings are accordingly to be regarded in an illustrative rather than in a restrictive sense and it is not the intention of the applicants to restrict or in any way limit the scope of the appended claims to such detail. It will, however, be evident to those skilled in the art that additional advantages and modifications can be made, in a computer program product or software, hardware or any combination thereof, without departing from the broader spirit and scope of the invention will readily appear. Software embodiments may include an article of manufacture on a machine accessible or machine readable medium having instructions. Furthermore, software embodiments may be distributed or downloaded via a network or email. The instructions on the machine accessible or machine readable medium may be used to program a computer system such as for example, a PC, cell phone, industrial mobile computer, PDA, electronic headset or other electronic device to perform example embodiment methods or approaches described herein. The machine-readable medium may include, but is not limited to, floppy diskettes, optical disks, CD-ROMs, and magneto-optical disks or other type of media/machine-readable medium suitable for storing or transmitting electronic instructions. Furthermore, departures may be made from the application in which the invention is described without departing from the spirit and scope of the invention. For example, the example speech recognition system described herein has focused on wearable terminals. However, the principles of the invention are applicable to other speech recognition environments as well.

What is claimed is:

1. A method for efficient use of resources of a speech recognition system, comprising:

using at least one processor, determining a recognition rate, corresponding to either recognition of instances of a word or recognition of instances of various words among a set of words;

determining an accuracy range of the recognition rate, corresponding to a desired confidence level; and using a recognition rate threshold and the desired confidence level upon which to base model adaptation, wherein a model for the word is adapted or various models for the various words are adapted, based upon a comparison of at least one value in the accuracy range with the recognition rate threshold.

2. The method of claim 1, further comprising:
withholding adapting the model or the various models, until a predetermined number of observations has occurred.

3. The method of claim 1, wherein the accuracy range is based on a number of observations of the system.

4. The method of claim 2, wherein the number of observations needed to determine whether to adapt the model is inversely related to the difference between the recognition rate and the recognition rate threshold.

5. The method of claim 1, wherein determining the recognition rate comprises dividing a number of errors made by the system by a number of observations of the system or dividing a number of correct observations of the system by a number of observations of the system.

6. The method of claim 5, wherein the errors or correct observations are estimated errors or estimated correct observations determined from evaluating system behavior.

7. The method of claim 1, wherein adapting the model or the various models further comprises withholding adapting until the at least one value in the accuracy range is equal to the recognition rate threshold, or withholding adapting until the at least one value in the accuracy range exceeds the recognition rate threshold if the recognition rate is an error rate, or withholding adapting until the at least one value in the accuracy range is below the recognition rate threshold if the recognition rate is an accuracy rate.

8. The method of claim 1, wherein the recognition rate threshold is a dynamic value.

9. The method of claim 1, wherein the recognition rate threshold is based on a background noise level.

10. The method of claim 1, wherein the recognition rate threshold is based on a signal-to-noise ratio.

11. The method of claim 1, wherein the recognition rate threshold is based on a number of words in a vocabulary of the system.

12. The method of claim 1, wherein the recognition rate threshold is based a recognition rate corresponding to a particular user or users of the system.

13. A method for efficient use of resources of a speech recognition system, comprising:
using a recognition rate threshold and a desired confidence level of a recognition rate upon which to base adaptation of a model;
using at least one processor, determining a recognition rate;
determining an accuracy range of the recognition rate corresponding to the desired confidence level, the accuracy range related to a number of observations;
using a relationship between the recognition rate threshold, the recognition rate and the number of observations, which balances the accuracy of the recognition rate with expediency in making a model adaptation decision; and
basing a decision for model adaptation on using the relationship.

14. The method of claim 13, further comprising:
withholding model adaptation until a predetermined number of observations has occurred.

15. The method of claim 13, wherein the accuracy range is inversely related to the number of observations.

16. The method of claim 13, wherein the number of observations needed to determine whether to adapt is inversely related to the difference between the recognition rate and the recognition rate threshold.

17. The method of claim 13, wherein determining the recognition rate comprises dividing a number of errors made by the system by a number of observations of the system or dividing a number of correct observations of the system by a number of observations of the system.

18. The method of claim 17, wherein the errors or correct observations of the system are estimated errors or correct observations determined from evaluating system behavior.

19. The method of claim 13, wherein the decision to adapt the model comprises deciding whether to perform the model adaptation or withhold the model adaptation.

20. The method of claim 13, wherein the recognition rate threshold is a dynamic value.

21. The method of claim 13, wherein the recognition rate threshold is based on a background noise level.

22. The method of claim 13, wherein the recognition rate threshold is based on a signal-to-noise ratio.

23. The method of claim 13, wherein the recognition rate threshold is based on a number of words in a vocabulary of the system.

24. A method for efficient use of resources of a speech recognition system comprising:
using at least one processor, determining a recognition rate, corresponding to either recognition of instances of a word or recognition of instances of various words among a set of words;
determining an accuracy range of the recognition rate; and
adjusting adaptation, of a model for the word or various models for the various words, based on at least one value in the accuracy range being equal to a recognition rate threshold, or based on at least one value in the accuracy range exceeding a recognition rate threshold if the recognition rate is an error rate, or based on at least one value in the accuracy range being below the recognition rate threshold if the recognition rate is an accuracy rate.

25. The method of claim 24, further comprising:
withholding adjusting the adaptation, until a predetermined number of observations has occurred.

26. The method of claim 24, further comprising updating the recognition rate and the accuracy range of the recognition rate after a predetermined number of observations has occurred.

27. The method of claim 24, wherein the accuracy range is based on a number of observations of the system.

28. The method of claim 24, wherein determining the recognition rate comprises dividing a number of errors made by the system by a number of observations of the system or dividing a number of correct observations of the system by a number of observations of the system.

29. The method of claim 28, wherein the errors or correct observations of the system are estimated errors or correct observations determined from evaluating system.

30. The method of claim 24, wherein adjusting the adaptation comprises adapting the model or the various models or withholding adapting the model or the various models.

31. The method of claim 24, wherein adjusting adaptation of the model comprises withholding adapting the model or the various models until the at least one value in the accuracy range is equal to a recognition rate threshold, or withholding adapting the model or the various models until the at least one value in the accuracy range exceeds a recognition rate threshold if the recognition rate is an error rate, or withholding adapting the model or the various models until the at least one value in the accuracy range is below a recognition rate threshold if the recognition rate is an accuracy rate.

32. The method of claim 24, wherein the recognition rate threshold is a dynamic value.

33. The method of claim 24, wherein the recognition rate threshold is based on a background noise level.

34. The method of claim 24, wherein the recognition rate threshold is based on a signal-to-noise ratio.

35. The method of claim 24, wherein the recognition rate threshold is based on a number of words in a vocabulary of the system.

36. A apparatus for efficient use of resources of a speech recognition system, comprising:
a processor configured to determine a recognition rate, corresponding to either recognition of instances of a word or recognition of instances of various words among a set of words, and an accuracy range of the recognition rate corresponding to a desired confidence level; and
a controller configured to use a recognition rate threshold and the desired confidence level upon which to base model adaptation, by adapting of a model for the word or various models for the various words, based upon a comparison of at least one value in the accuracy range with the recognition rate threshold.

37. The apparatus of claim 36, wherein the processor withholds adapting the model or the various models, until a predetermined number of observations has occurred.

38. The apparatus of claim 36, wherein the accuracy range is based on a number of observations of the system.

39. The apparatus of claim 36, wherein the number of observations needed to determine whether to adapt the model is inversely related to the difference between the recognition rate and the recognition rate threshold.

40. The apparatus of claim 36, wherein the processor determines the recognition rate by dividing a number of errors made by the system by a number of observations of the system or dividing a number of correct observations of the system by a number of observations of the system.

41. The apparatus of claim 40, wherein the errors or correct observations of the system are estimated errors or correct observations determined from evaluating system behavior.

42. The apparatus of claim 36, wherein the controller controls adaptation of the model or the various models by withholding adapting the model or the various models until the at least one value in the accuracy range is equal to the recognition rate threshold, or withholding adapting the model or the various models until the at least one value in the accuracy range exceeds the recognition rate threshold if the recognition rate is an error rate, or withholding adapting the model or the various models until the at least one value in the accuracy range is below the recognition rate threshold if the recognition rate is an accuracy rate.

43. The apparatus of claim 36, wherein the recognition rate threshold is a dynamic value.

44. The apparatus of claim 36, wherein the recognition rate threshold is based on a background noise level.

45. The apparatus of claim 36, wherein the recognition rate threshold is based on a signal-to-noise ratio.

46. The apparatus of claim 36, wherein the recognition rate threshold is based on a number of words in a vocabulary of the system.

47. The apparatus of claim 36, wherein the recognition rate threshold is based on a recognition rate corresponding to a particular user or users of the system.

48. A apparatus for efficient use of resources of a speech recognition system, comprising:
a selector configured to use a recognition rate threshold and a desired confidence level of a recognition rate, upon which to base adaptation of a model;
a processor configured to determine a recognition rate and an accuracy range of the recognition rate corresponding to the desired confidence level, the accuracy range related to a number of observations; and
a controller configured to use a relationship between the recognition rate threshold, the recognition rate and the number of observations, which balances the accuracy of the recognition rate with expediency in making a model adaptation decision and base a decision for model adaptation on using the relationship.

49. The apparatus of claim 48, further comprising:
withholding model adaptation until a predetermined number of observations has occurred.

50. The apparatus of claim 48, wherein the accuracy range is inversely related to the number of observations.

51. The apparatus of claim 48, wherein the number of observations needed to determine whether to adapt is inversely related to the difference between the recognition rate and the recognition rate threshold.

52. The apparatus of claim 48, wherein the processor determines the recognition rate by dividing a number of errors made by the system by a number of observations of the system or dividing a number of correct observations of the system by a number of observations of the system.

53. The apparatus of claim 52, wherein the errors or correct observations of the system are estimated errors or correct observations determined from evaluating system behavior.

54. The apparatus of claim 48, wherein the decision to adapt the model comprises deciding whether to perform the model adaptation or withhold the model adaptation.

55. The apparatus of claim 48, wherein the recognition rate threshold is a dynamic value.

56. The apparatus of claim 48, wherein the recognition rate threshold is based on a background noise level.

57. The apparatus of claim 48, wherein the recognition rate threshold is based on a signal-to-noise ratio.

58. The apparatus of claim 48, wherein the recognition rate threshold is based on a number of words in a vocabulary of the system.

59. A apparatus for efficient use of resources of a speech recognition system comprising:
a processor configured to determine a recognition rate, corresponding to either recognition of instances of a word or recognition of instances of various words among a set of words, and an accuracy range of the recognition rate; and
a controller configured to adjust adaptation of a model for the word or various models for the various words, based on a comparison of at least one value in the accuracy range with a recognition rate threshold.

60. The apparatus of claim 59, further comprising:
withholding adjusting the adaptation, until a predetermined number of observations has occurred.

61. The apparatus of claim 59, wherein the processor updates the recognition rate and the accuracy range of the recognition rate after a predetermined number of observations has occurred.

62. The apparatus of claim 59, wherein the accuracy range is based on a number of observations of the system.

63. The apparatus of claim 59, wherein the processor determines the recognition rate by dividing a number of errors made by the system by a number of observations of the system or dividing a number of correct observations of the system by a number of observations of the system.

64. The apparatus of claim 63, wherein the errors or correct observations of the system are estimated errors or correct observations determined from evaluating system behavior.

65. The apparatus of claim 59, wherein the controller adjusts the adaptation by permitting adapting the model or the various models or withholding adapting the model or the various models.

66. The apparatus of claim 59, wherein the controller adjusts the adaptation of the model by withholding adapting the model or the various models until the at least one value in the accuracy range is equal to or exceeds a recognition rate threshold if the recognition rate is an error rate, or withholding adapting the model or the various models until the at least one value in the accuracy range is equal to or is below a recognition rate threshold if the recognition rate is an accuracy rate.

67. The apparatus of claim 59, wherein the recognition rate threshold is a dynamic value.

68. The apparatus of claim 59, wherein the recognition rate threshold is based on a background noise level.

69. The apparatus of claim 59, wherein the recognition rate threshold is based on a signal-to-noise ratio.

70. The apparatus of claim 59, wherein the recognition rate threshold is based on a number of words in a vocabulary of the system.

* * * * *

UNITED STATES PATENT AND TRADEMARK OFFICE
CERTIFICATE OF CORRECTION

PATENT NO. : 7,895,039 B2
APPLICATION NO. : 11/688920
DATED : February 22, 2011
INVENTOR(S) : Keith Braho et al.

Page 1 of 1

It is certified that error appears in the above-identified patent and that said Letters Patent is hereby corrected as shown below:

In the Claims:

Column 23, approximately Line 41, Claim 12, reads "...based a recognition rate corresponding..." should read --based on a recognition rate corresponding...--.

Column 24, approximately Line 52, Claim 29, reads "...observations determined from evaluating system..." should read --observations determined from evaluating the system...--.

Column 25, approximately Line 8, Claim 36, reads "A apparatus for..." should read --An apparatus for...--.

Column 25, approximately Line 62, Claim 48, reads "A apparatus for..." should read --An apparatus for...--.

Column 26, approximately Line 40, Claim 59, reads "A apparatus for..." should read --An apparatus for...--.

Signed and Sealed this
Twenty-fifth Day of June, 2013

Teresa Stanek Rea
*Acting Director of the United States Patent and Trademark Office*